(12) United States Patent
Dowling et al.

(10) Patent No.: US 11,669,879 B2
(45) Date of Patent: Jun. 6, 2023

(54) COMPUTER-IMPLEMENTED METHOD, A COMPUTER PROGRAM PRODUCT AND A SYSTEM FOR GENERATING AN ARTICLE OF MANUFACTURE

(71) Applicant: EDRLL LTD, Monkstown (IE)

(72) Inventors: Ciara Dowling, Monkstown (IE); Eoin Dowling, Monkstown (IE); Kevin Burkitt, Monkstown (IE)

(73) Assignee: EDRLL LTD, Monkstown (IE)

(*) Notice: Subject to any disclaimer, the term of this patent is extended or adjusted under 35 U.S.C. 154(b) by 191 days.

(21) Appl. No.: 17/293,757

(22) PCT Filed: Nov. 13, 2018

(86) PCT No.: PCT/EP2018/081082
§ 371 (c)(1),
(2) Date: May 13, 2021

(87) PCT Pub. No.: WO2020/098921
PCT Pub. Date: May 22, 2020

(65) Prior Publication Data
US 2022/0012786 A1 Jan. 13, 2022

(51) Int. Cl.
*G06Q 30/00* (2023.01)
*G06Q 30/0601* (2023.01)

(52) U.S. Cl.
CPC ..... *G06Q 30/0621* (2013.01); *G06Q 30/0633* (2013.01); *G06Q 30/0639* (2013.01); *G06Q 30/0643* (2013.01)

(58) Field of Classification Search
CPC ........... G06Q 30/0601; G06Q 30/0613; G06Q 30/0621; G06Q 30/0623; G06Q 30/0629;
(Continued)

(56) References Cited

U.S. PATENT DOCUMENTS 6,431,669 B1 * 8/2002 Silverbrook ........... B41J 2/1646
348/E5.055
7,987,188 B2 * 7/2011 Neylon ................. G06F 16/313
706/45

(Continued)

OTHER PUBLICATIONS

Regier, Jeffrey, et al. "Learning an astronomical catalog of the visible universe through scalable Bayesian inference." arXiv preprint arXiv: 1611.03404 (2016). (Year: 2016).*

*Primary Examiner* — Christopher B Seibert
(74) *Attorney, Agent, or Firm* — Brian J. Colandreo; Jeffery T. Placker; Holland & Knight LLP

(57) ABSTRACT

This invention relates to a computer-implemented method, a computer program product and a system for generating an article of manufacture. More specifically, the method, computer program product and the system are configured for providing a highly individualised article of manufacture suitable for presentation as a gift or memento. The method comprises the steps of receiving user input data including one or more of the date, time and location of a special event and thereafter accessing an astronomical catalogue and retrieving from the astronomical catalogue astrometric and photometric data of a plurality of celestial bodies for the date, time and location before rendering a plot of the celestial bodies along with other pertinent information on the article of manufacture.

18 Claims, 15 Drawing Sheets

(58) Field of Classification Search
CPC ........... G06Q 30/0631; G06Q 30/0639; G06Q 30/0641
See application file for complete search history.

(56) References Cited

U.S. PATENT DOCUMENTS

| | | | |
|---|---|---|---|
| 8,386,336 B1* | 2/2013 | Fox | G06Q 30/0631 705/26.7 |
| 8,417,713 B1* | 4/2013 | Blair-Goldensohn | G06F 16/24578 705/347 |
| 8,885,443 B2* | 11/2014 | Marzouq | G04G 9/0076 368/16 |
| 2001/0021914 A1* | 9/2001 | Jacobi | G06Q 30/0641 705/26.1 |
| 2005/0162670 A1* | 7/2005 | Shuler | H04N 1/00408 358/1.2 |
| 2007/0046675 A1* | 3/2007 | Iguchi | G06T 11/206 345/441 |
| 2009/0110089 A1* | 4/2009 | Green | H04L 5/0037 370/329 |
| 2009/0125371 A1* | 5/2009 | Neylon | G06F 16/313 707/739 |
| 2010/0268661 A1* | 10/2010 | Levy | G06Q 30/02 705/347 |
| 2014/0195931 A1* | 7/2014 | Kwon | G06Q 30/02 715/753 |
| 2014/0351079 A1* | 11/2014 | Dong | G06Q 30/0282 705/26.7 |
| 2015/0229264 A1* | 8/2015 | Truncale | F24S 50/20 700/275 |
| 2015/0379732 A1* | 12/2015 | Sayre, III | G06Q 30/0623 382/164 |
| 2017/0098160 A1* | 4/2017 | Chaudhuri | G06N 5/00 |
| 2017/0193997 A1* | 7/2017 | Chen | G10L 13/08 |
| 2017/0268882 A1* | 9/2017 | Bellora | G01C 21/02 |
| 2020/0118467 A1* | 4/2020 | Mase | G09F 13/005 |
| 2022/0402073 A1* | 12/2022 | Dowling | B44C 1/228 |

* cited by examiner

COMPUTER-IMPLEMENTED METHOD, A COMPUTER PROGRAM PRODUCT AND A SYSTEM FOR GENERATING AN ARTICLE OF MANUFACTURE

RELATED APPLICATIONS

The subject application is a U.S. National Stage application of International Application No. PCT/EP2018/081082, filed on 13 Nov. 2018. The contents of which are herein incorporated by reference in its entirety.

TECHNICAL FIELD

This invention relates to a computer-implemented method, a computer program product and a system for generating an article of manufacture. More specifically, the method, computer program product and the system are configured for providing a highly individualised article of manufacture suitable for presentation as a gift or memento.

BACKGROUND ART

Gift giving is a fundamental component of building lasting friendships and relationships. The more personalised the gift, the more thoughtful the giver of the gift is considered to be and as a consequence, the greater the emotional response elicited from the gift recipient is likely to be. This is highly desirable for both the gift recipient and the gift giver and facilitates the creation of an emotional bond therebetween.

With the advent of the internet age, one would consider that it is becoming increasingly easier to access new and personalised gifts for recipients as the choice of gift has theoretically increased exponentially. However, often, the opposite has been found to be the case. The gift recipient is often familiar with the plethora of offerings available and whereas previously offerings in other jurisdictions may be unknown or unavailable to the gift recipient, there is an increasing awareness of the different offerings that are available across the globe. Furthermore, trends in consumer products that may be suitable for gifting are becoming more global in nature and anecdotally at least, it is becoming increasingly difficult to find a truly bespoke, personalised gift.

Additionally, there are several technical problems that must be overcome in order to provide highly individualised articles of manufacture. By their very nature, these items are not manufactured in large manufacturing runs and accordingly there is a substantial technological barrier to their provision on a sustainable scale and suitable timeframe.

Various offerings have been proposed to provide individualised gifts and articles of manufacture. U.S. Pat. No. 9,483,786 in the name of Gift Card Impressions LLC discloses a gift card ordering system and method that provides a personalised gift card for the recipient. U.S. Pat. No. 9,811,833 in the name of Amazon Technologies, Inc., discloses a method and system for gift ordering that is subject to rules defined by a gift giver, thereby providing a more personalised gift. Other systems and methods have been proposed that facilitate the provision of bespoke items. European Patent No. EP1,075,138 in the name of Sony Corporation discloses a print order/delivery system and method, digital camera, client information registration device, ordering terminal and printing system suitable for the order and delivery of a digital print.

It is an object of the present invention to provide a computer-implemented method, computer program product and a system for generating an article of manufacture that overcome at least some of the above-identified problems. It is a further object of the present invention to provide a useful choice for the consumer.

SUMMARY OF INVENTION

According to the invention there is provided a computer-implemented method for generating an article of manufacture in a system comprising:

a user computing device (UCD) having a processor, a memory, a graphical user interface (GUI) and a communications module for communications with a remote device;

a provider computing device (PCD) having a processor, a memory having an article of manufacture template thereon, and a communications module for communications with remote devices;

an astronomical catalogue accessible to the PCD, the astronomical catalogue containing astrometric and photometric data of a plurality of celestial bodies; and a print lab device (PLD) having a processor, a memory, a print application programming interface (API) and an accessible printer peripheral device; the method comprising the steps of:

an operator of the UCD inputting into the GUI of the UCD one or more of a date, a time and a location and transmitting the one or more of the date, the time and the location to the PCD;

the PCD receiving the one or more of the date, the time and the location from the UCD;

the PCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the PCD populating the article of manufacture template with a rendering of the astrometric and photometric data of the plurality of celestial bodies for the one or more of the date, the time and the location along with one or more of the date, the time and the location;

the PCD transmitting the populated article of manufacture template to the UCD for display on the GUI of the UCD to the operator of the UCD;

the operator of the UCD transmitting an order confirmation to the PCD;

the PCD, on receipt of the order confirmation, transmitting the populated article of manufacture template to the print API of the PLD;

the PLD sending the populated article of manufacture template to the accessible printer peripheral device and the accessible printer peripheral device thereafter printing the populated article of manufacture template for shipping.

By having such a computer-implemented method, it is possible to provide a highly individualised article of manufacture. This article of manufacture is ideal for giving as a gift or for keeping as a memento. Advantageously, practically each and every article manufactured will be unique thereby allowing the provision of a truly bespoke gift with all the intangible benefits associated therewith. Furthermore, by implementing the method, it is possible to provide several disparate articles of manufacture in an efficient and effective manner.

In one embodiment of the invention there is provided a computer-implemented method in which the article of manufacture template comprises a pair of distinct fields including a celestial map field and a text field set in a defined location on the template and in a fixed spatial relationship with respect to each other, and in which the step of the PCD populating the article of manufacture template comprises populating the celestial map field with the rendering of the astrometric and photometric data of the plurality of celestial bodies and populating the text field with the one or more of the date, the time and the location.

In this way, the layout of the article of manufacture will have some components that are common to all articles that are produced, thereby providing a method that is easier and faster to operate and that will facilitate the identification of spoiled articles.

In one embodiment of the invention there is provided a computer-implemented method in which the method comprises the additional intermediate steps of:

displaying one or more template criteria to the operator of the UCD on the GUI;

the operator inputting into the GUI of the UCD settings for each of the template criteria and transmitting the settings for each of the template crierial along with the one or more of the date, the time and the location to the PCD; and the PCD further populating the article of manufacture template in accordance with the settings of the template criteria.

In this way, the operator is able to further individualise their article of manufacture prior to dispatch from a number of known options. This provides a very effective and efficient method of manufacturing the article for both the customer and the provider and allows the provider to offer greater choice to the consumer while at the same time ensuring that they can closely control their stock and consumable requirements.

In one embodiment of the invention there is provided a computer-implemented method in which the method comprises the steps of:

determining the shipping address for the populated article of manufacture template; and the PCD, on receipt of the order confirmation, selecting one of a plurality of geographically spread PLDs based on the proximity of the PLD to the shipping address prior to transmitting the populated article of manufacture template to the print API of the selected PLD.

By having such a method, the article of manufacture may be delivered to the end user faster and more cost effectively than was heretofore the case. It is envisaged that the operator will have a plurality of PLDs in different jurisdictions able to print and ship the article of manufacture to the customer. This will also spread the load of printing across a number of facilities thereby providing a level of redundancy into the system that will help manage PLD downtime in the event of printer failure or maintenance.

In one embodiment of the invention there is provided a computer-implemented method in which instead of the step of the PCD transmitting the populated article of manufacture template to the UCD for display on the GUI of the UCD to the operator of the UCD, the method comprises the initial step of:

loading a star map rendering module including an astronomical catalogue and an article of manufacture template onto the UCD; and thereafter the subsequent intermediate steps of:

the UCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the UCD populating the article of manufacture template with a rendering of the astrometric and photometric data of the plurality of celestial bodies for the one or more of the date, the time and the location along with one or more of the date, the time and the location; and the UCD displaying the populated article of manufacture template on the GUI of the UCD to the operator of the UCD.

In this way, the article of manufacture template may be updated and displayed in real time on the UCD without requiring updated templates to be provided from the PCD each time there is a change to the template. This will avail of the processing power of the UCD and reduce the communications required to and from the PCD, thereby reducing bandwidth requirement and costs.

In one embodiment of the invention there is provided a computer program product residing on a computer readable medium having a plurality of instructions stored thereon which, when executed by a processor, cause the processor to perform operations comprising:

receiving one or more of a date, a time and a location from a remote user computing device (UCD);

accessing an astronomical catalogue and inputting the one or more of the date, the time and the location into the astronomical catalogue and retrieving from the astronomical catalogue astrometric and photometric data of a plurality of celestial bodies for the one or more of the date, the time and the location;

populating an article of manufacture template with a rendering of the astrometric and photometric data of the plurality of celestial bodies for the one or more of the date, the time and the location along with one or more of the date, the time and the location;

receiving an order confirmation from the remote UCD, and, on receipt of the order confirmation, transmitting the populated article of manufacture template to the print application programming interface (API) of a print lab device (PLD).

In one embodiment of the invention there is provided a computer program product in which the article of manufacture template comprises a pair of distinct fields including a celestial map field and a text field set in a defined location on the template and in a fixed spatial relationship with respect to each other, and in which the step of populating the article of manufacture template comprises populating the celestial map field with the rendering of the astrometric and photometric data of the plurality of celestial bodies and populating the text field with the one or more of the date, the time and the location.

In one embodiment of the invention there is provided a computer program product comprising the additional intermediate steps of:

receiving settings for a plurality of template crierial along with the one or more of the date, the time and the location; and further populating the article of manufacture template in accordance with the settings of the template criteria.

In one embodiment of the invention there is provided a computer program product comprising the steps of:

determining the shipping address for the populated article of manufacture template; and selecting one of a plurality of geographically spread PLDs based on the proximity of the PLD to the shipping address prior to transmitting the populated article of manufacture template to the print API of the selected PLD.

In one embodiment of the invention there is provided a computer program product residing on a computer readable medium having a plurality of instructions stored thereon which, when executed by a processor, cause the processor to perform the step of:

transmitting the populated article of manufacture template to a remote UCD for display on a graphical user interface (GUI) of the UCD.

In one embodiment of the invention there is provided a computing system for generating an article of manufacture comprising:

a remote user computing device (UCD) having a processor, a memory, a graphical user interface (GUI) and a communications module for communications with a remote device;

a provider computing device (PCD) having a processor, a memory having an article of manufacture template thereon, and a communications module for communications with remote devices;

an astronomical catalogue accessible to the PCD, the astronomical catalogue containing astrometric and photometric data of a plurality of celestial bodies; and a print lab device (PLD) having a processor, a memory, a print application programming interface (API) and an accessible printer peripheral device; the system being configured to perform the operations of:

receiving from an operator of the UCD input into the GUI of the UCD comprising one or more of a date, a time and a location and transmitting the one or more of the date, the time and the location to the PCD;

the PCD receiving the one or more of the date, the time and the location from the UCD;

the PCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the PCD populating the article of manufacture template with a rendering of the astrometric and photometric data of the plurality of celestial bodies for the one or more of the date, the time and the location along with one or more of the date, the time and the location;

the PCD transmitting the populated article of manufacture template to the UCD for display on the GUI of the UCD to the operator of the UCD;

the UCD transmitting an order confirmation to the PCD;

the PCD, on receipt of the order confirmation, transmitting the populated article of manufacture template to the print API of the PLD;

the PLD sending the populated article of manufacture template to the accessible printer peripheral device and the accessible printer peripheral device thereafter printing the populated article of manufacture template for shipping.

In one embodiment of the invention there is provided a computing system for generating an article of manufacture in which the article of manufacture template comprises a pair of distinct fields including a celestial map field and a text field set in a defined location on the template and in a fixed spatial relationship with respect to each other, and in which the system is configured to populate the celestial map field with the rendering of the astrometric and photometric data of the plurality of celestial bodies and populate the text field with the one or more of the date, the time and the location.

In one embodiment of the invention there is provided a computing system for generating an article of manufacture in which the system is configured to:

receive settings for a plurality of template criterial along with the one or more of the date, the time and the location; and further populate the article of manufacture template in accordance with the settings of the template criteria.

In one embodiment of the invention there is provided a computing system for generating an article of manufacture in which the system is configured to:

determine the shipping address for the populated article of manufacture template; and select one of a plurality of geographically spread PLDs based on the proximity of the PLD to the shipping address prior to transmitting the populated article of manufacture template to the print API of the selected PLD.

In one embodiment of the invention there is provided a computing system for generating an article of manufacture in which instead of the system being configured to perform the step of the PCD transmitting the populated article of manufacture template to the UCD for display on the GUI of the UCD to the operator of the UCD, the system is configured to perform the initial step of:

loading a star map rendering module including an astronomical catalogue and an article of manufacture template onto the UCD; and the system is configured to thereafter perform the subsequent intermediate steps of:

the UCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the UCD populating the article of manufacture template with a rendering of the astrometric and photometric data of the plurality of celestial bodies for the one or more of the date, the time and the location along with one or more of the date, the time and the location; and the UCD displaying the thus-populated article of manufacture template on the GUI of the UCD to the operator of the UCD.

BRIEF DESCRIPTION OF THE DRAWINGS

The invention will now be more clearly understood from the following description of some embodiments thereof given by way of example only with reference to the accompanying drawings, in which: —

DETAILED DESCRIPTION OF THE DRAWINGS

Figure 1:
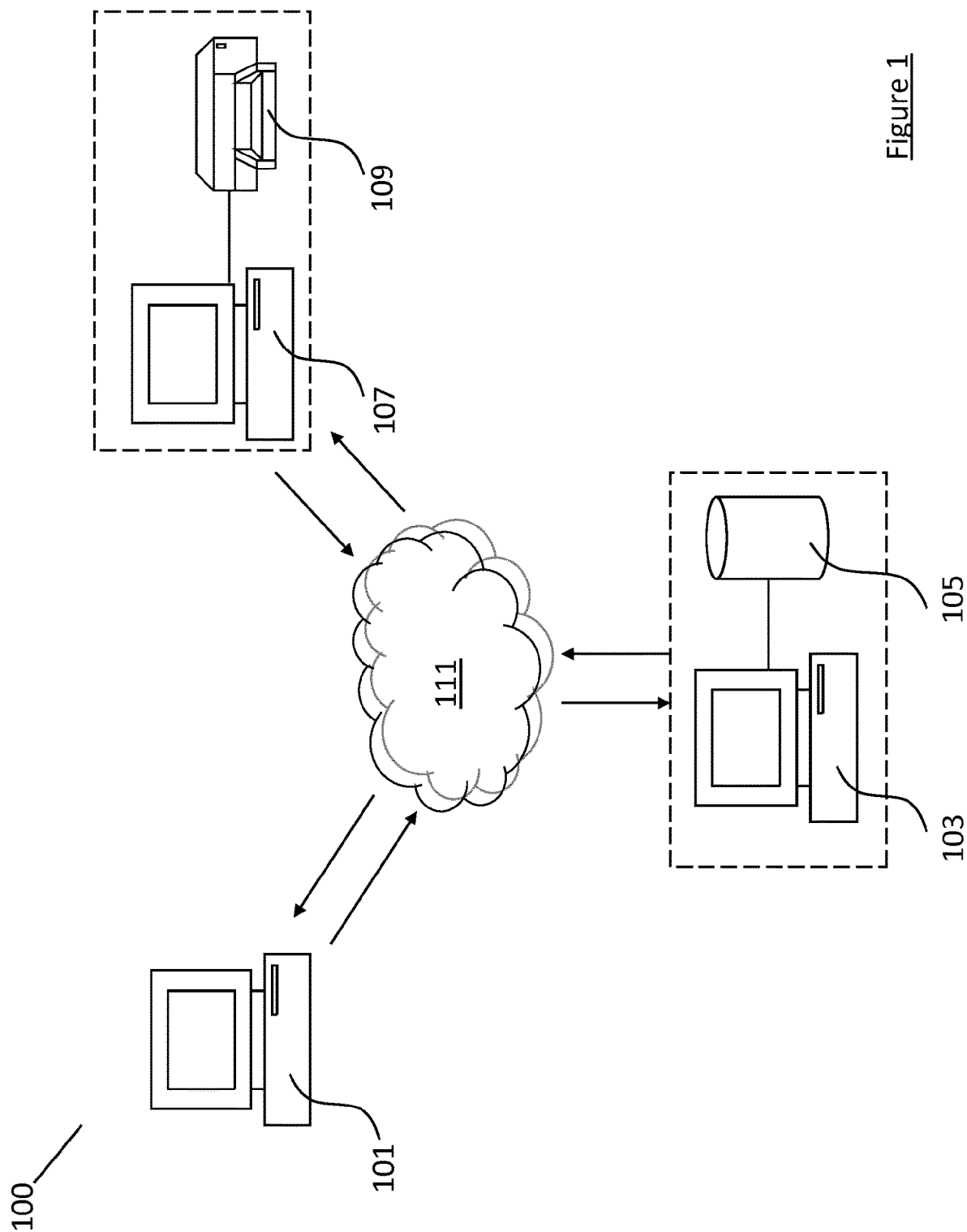
FIG. 1 is a diagrammatic representation of a system in which the computer-implemented method according to the invention may be performed.

Referring to FIG. 1, there is shown a diagrammatic representation of a system, indicated generally by the reference numeral 100, in which the computer-implemented method according to the invention may be performed. The system 100 comprises a user computing device (UCD) 101, a provider computing device (PCD) 103 having access to an astronomical catalogue 105, and a print lab device (PLD) 107 with an accessible printer peripheral device 109. The UCD 101, PCD 103 and PLD 107 communicate over a communications network 111.

The UCD 101 has a processor, a memory, a graphical user interface (GUI) and a communications module for communications with a remote device. The PCD 103 has a processor, a memory having at least one article of manufacture template stored thereon, and a communications module for communications with remote devices. The astronomical catalogue 105 accessible by the PCD 103 contains astrometric and photometric data of a plurality of celestial bodies. The PLD 107 has a processor, a memory and a print application programming interface (API) for interfacing with the accessible printer peripheral device 109. The operation of the components will be understood with reference to the flow diagram of FIG. 2.

Figure 2:
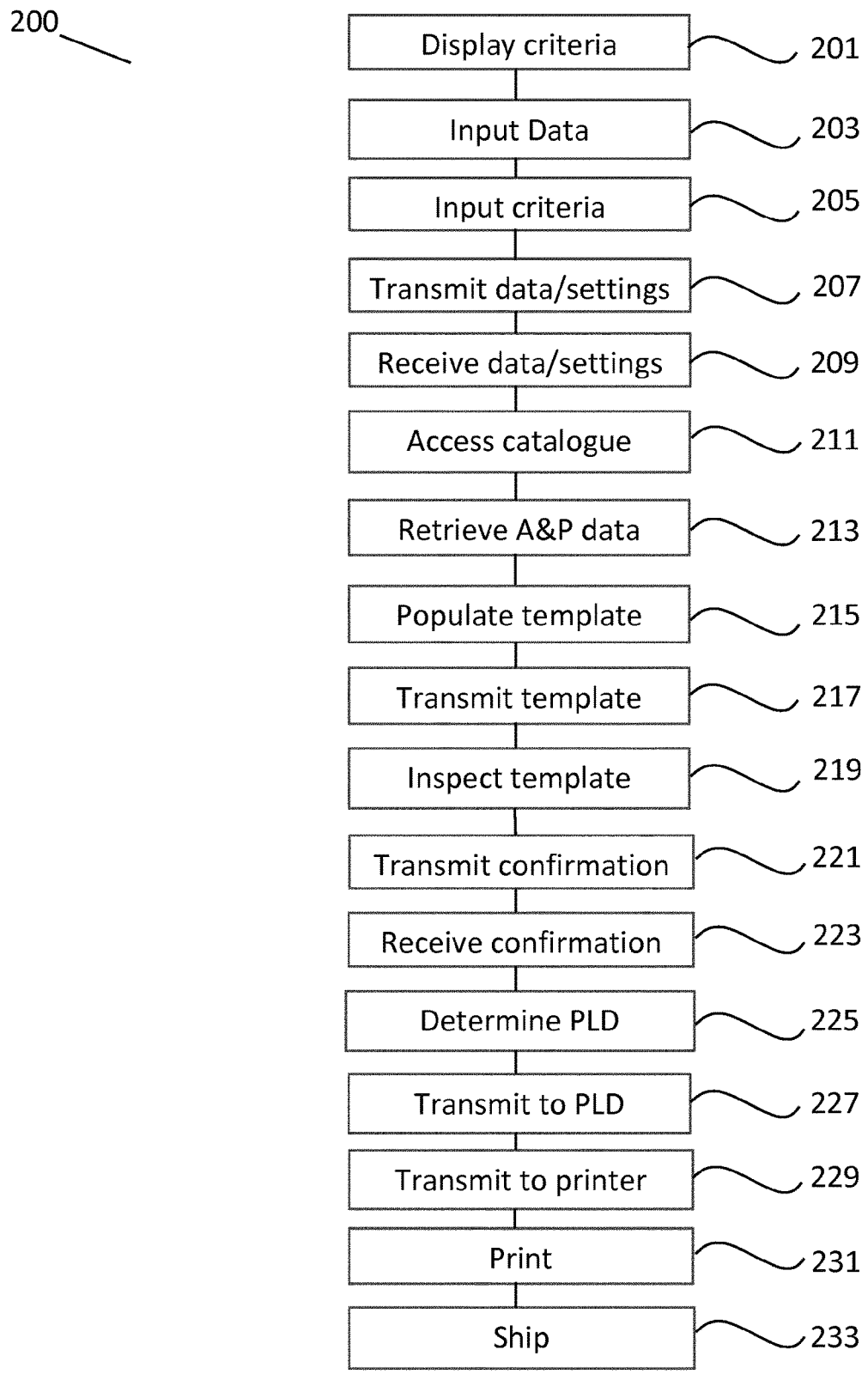
FIG. 2 is a flow diagram of a first embodiment of the computer-implemented method according to the invention.

Referring to FIG. 2, there is shown a flow diagram, indicated generally by the reference numeral 200 illustrating the steps of the computer implemented method according to the invention. In step 201, one or more template criteria are displayed to the operator of the UCD on the GUI of the UCD. In step 203, the operator of the UCD inputs data into the GUI of the UCD including one or more of a date, a time and a location. In step 205, the operator inputs into the GUI of the UCD settings for each of the template criteria. In step 207, the UCD transmits the settings for each of the template criterial along with the one or more of the date, the time and the location to the PCD 103.

In step 209, the PCD receives the settings and the data including one or more of the date, the time and the location from the UCD. In step 211, the PCD accesses the astronomical catalogue 105 and inputs the one or more of the date, the time and the location into the astronomical catalogue and in step 213, the PCD retrieves from the astronomical catalogue astrometric and photometric (A&P) data of the plurality of celestial bodies for the one or more of the date, the time and the location. In step 215, the PCD populates the article of manufacture template with a rendering of the astrometric and photometric data of the plurality of celestial bodies for the date, the time and the location along with one or more of the date, the time and the location. This includes the PCD populating the article of manufacture template celestial map field with the rendering of the astrometric and photometric data of the plurality of celestial bodies, populating the text field with the one or more of the date, the time and the location, and populating the article of manufacture template in accordance with the settings of the template criteria.

In step 217, the PCD 103 transmits the populated article of manufacture template to the UCD 101 for display on the GUI of the UCD for inspection by the operator of the UCD in step 219. If satisfied with the result, the operator of the UCD transmits an order confirmation to the PCD in step 221. If the operator is not satisfied, they can terminate the order or they can modify the data and or the criteria to obtain alternative renders until they are happy with the rendered result. Once satisfied, they can then send the order confirmation to the PCD.

In step 223, the PCD receives the order confirmation and in step 225, the PCD 103 determines the shipping address for the populated article of manufacture template and the PCD selects one of a plurality of geographically spread PLDs 107 based on the proximity of the PLD 107 to the shipping address. In step 227, the PCD transmits the populated article of manufacture template to the print API of the PLD. In step 229, the PLD sends the populated article of manufacture template to the accessible printer peripheral device 109 and the accessible printer peripheral device 109 thereafter prints the populated article of manufacture template in step 231 prior to shipping the article in step 233.

Figure 3:
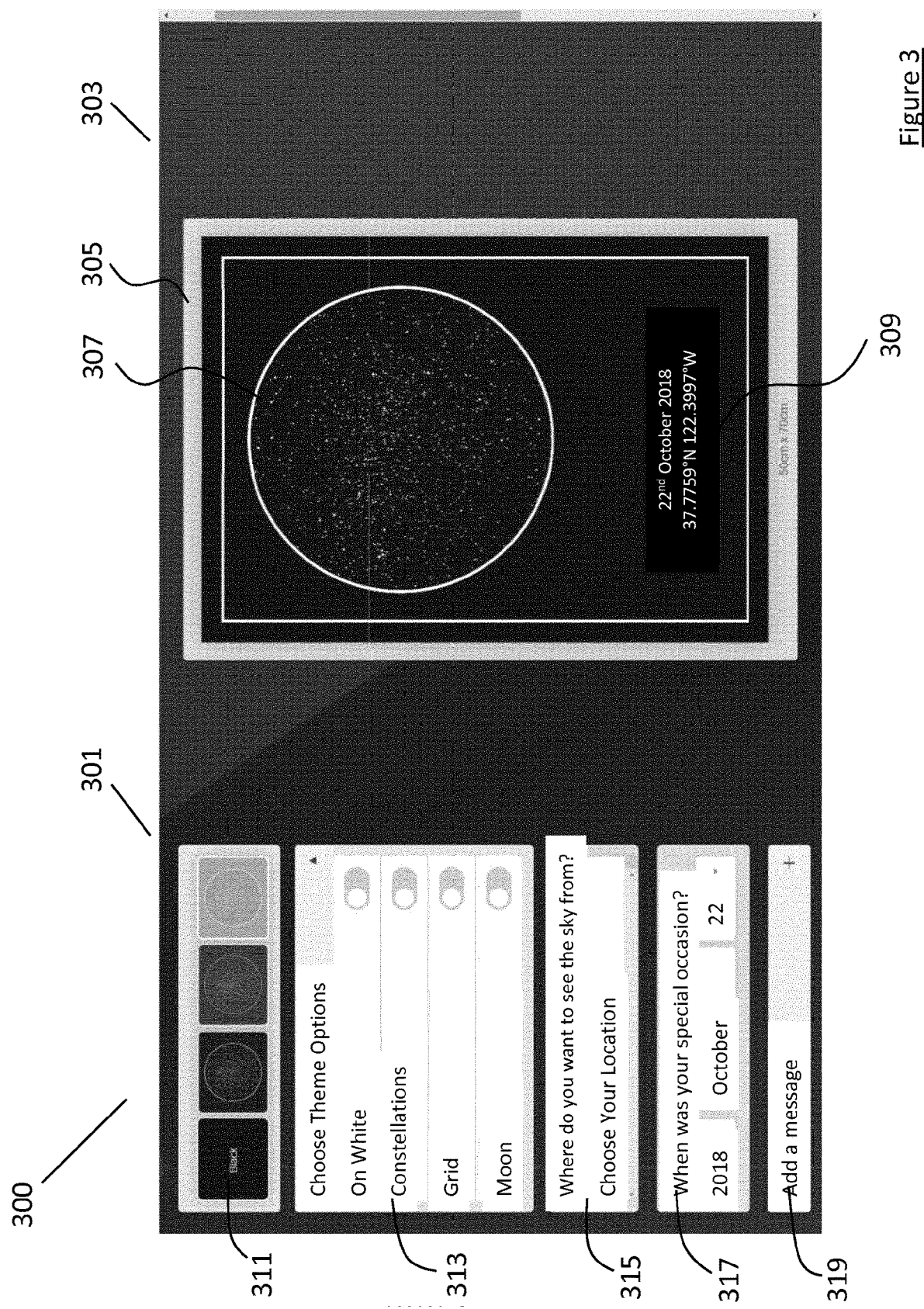
FIGS. 3 to 12 inclusive are screen shots of a user interface operable to implement part of the computer-implemented method.

Referring now to FIGS. 3 to 12 inclusive, there are shown a plurality of screen shots of a user interface as may be experienced by a user when operating a browser or a dedicated app on a UCD. The user interface is particularly simple and intuitive for a user to operate and navigate. Furthermore, the user interface is such that it may be rendered on a number of disparate devices with disparate form factors to good effect. Referring first of all to FIG. 3, there is shown a user interface, indicated generally by the reference numeral 300. The user interface comprises a split screen format with a left-hand side screen component 301 and a right-hand side screen component 303. The left-hand side screen component 301 comprises a menu of fields for insertion of user data and criteria that may be selected by the user.

The right-hand side screen component 303 comprises a template 305 with the graphical representation of the rendering of the astronomical catalogue based on the presently selected user data and criteria. Preferably, the user may scroll down the left-hand side screen component while at the same time the right hand-side screen component will remain fixed in position with the full representation of the article of manufacture template on display throughout. The template 305 comprises a pair of distinct fields 307, 309 including a celestial map field 307 and a text field 309 set in a defined location on the template and in a fixed spatial relationship with respect to each other. The celestial map field 307 contains a representation of the night sky as will be described in greater detail below. The text field 309 contains the date and default latitude and longitude coordinates.

As indicated above, the left-hand side screen component 301 comprises a menu of fields for insertion of user data and criteria that may be selected by the user. At the top of the screen is the colour menu field 311 with, in this example four colour option buttons for the user. In the present example, these colours are black, midnight blue, grey blue and grey. By clicking on one of the "buttons" corresponding to the colour, the coloured part of the template will assume that colour. This includes the background of the celestial map field 307, amongst others. Beneath the colour menu field 311 is a "choose theme options" criteria drop down list 313. There are four theme options criteria that the operator may choose from the list including "on white", "constellations", "grid" and "moon".

Figure 4:
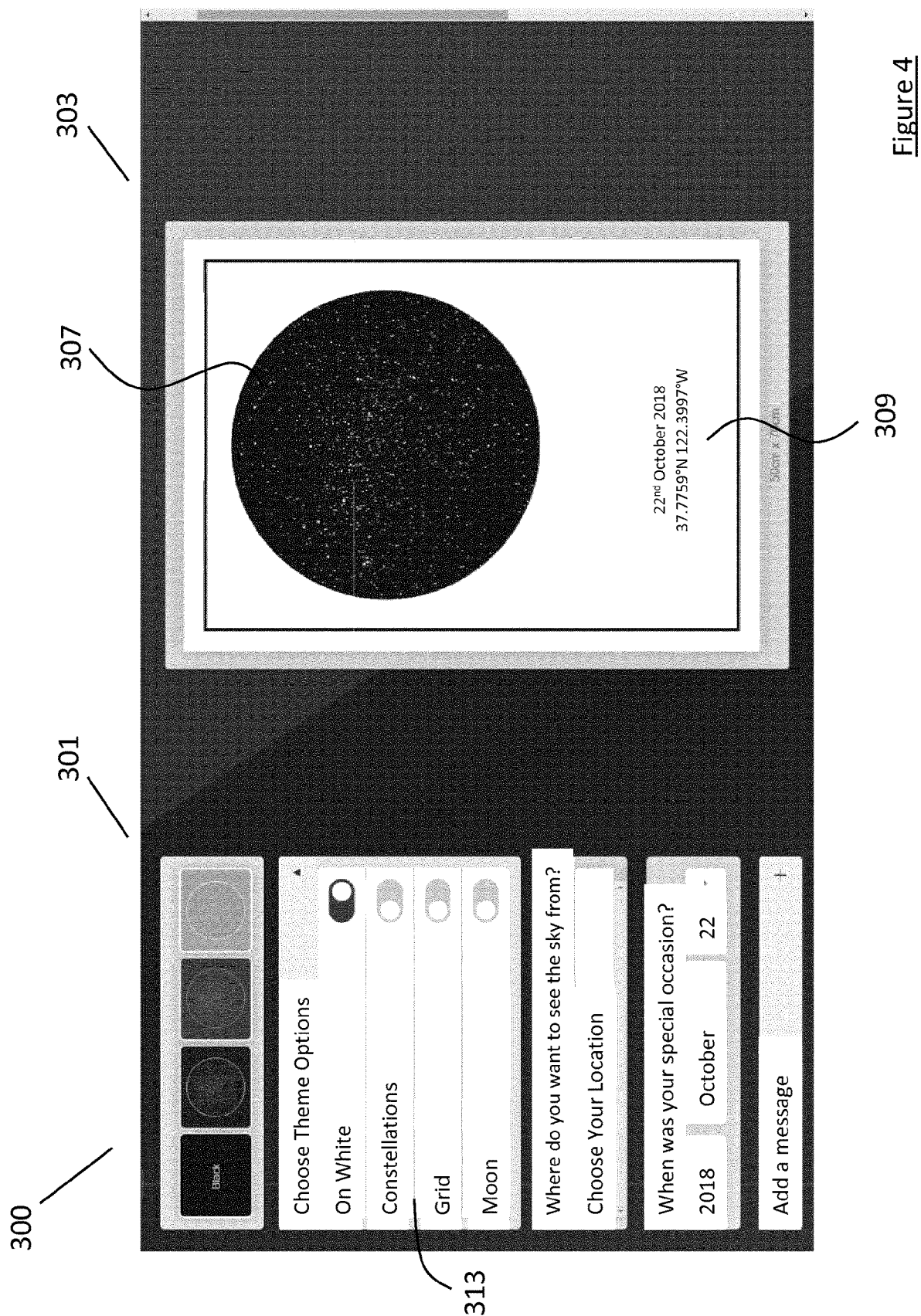
Figure 5:
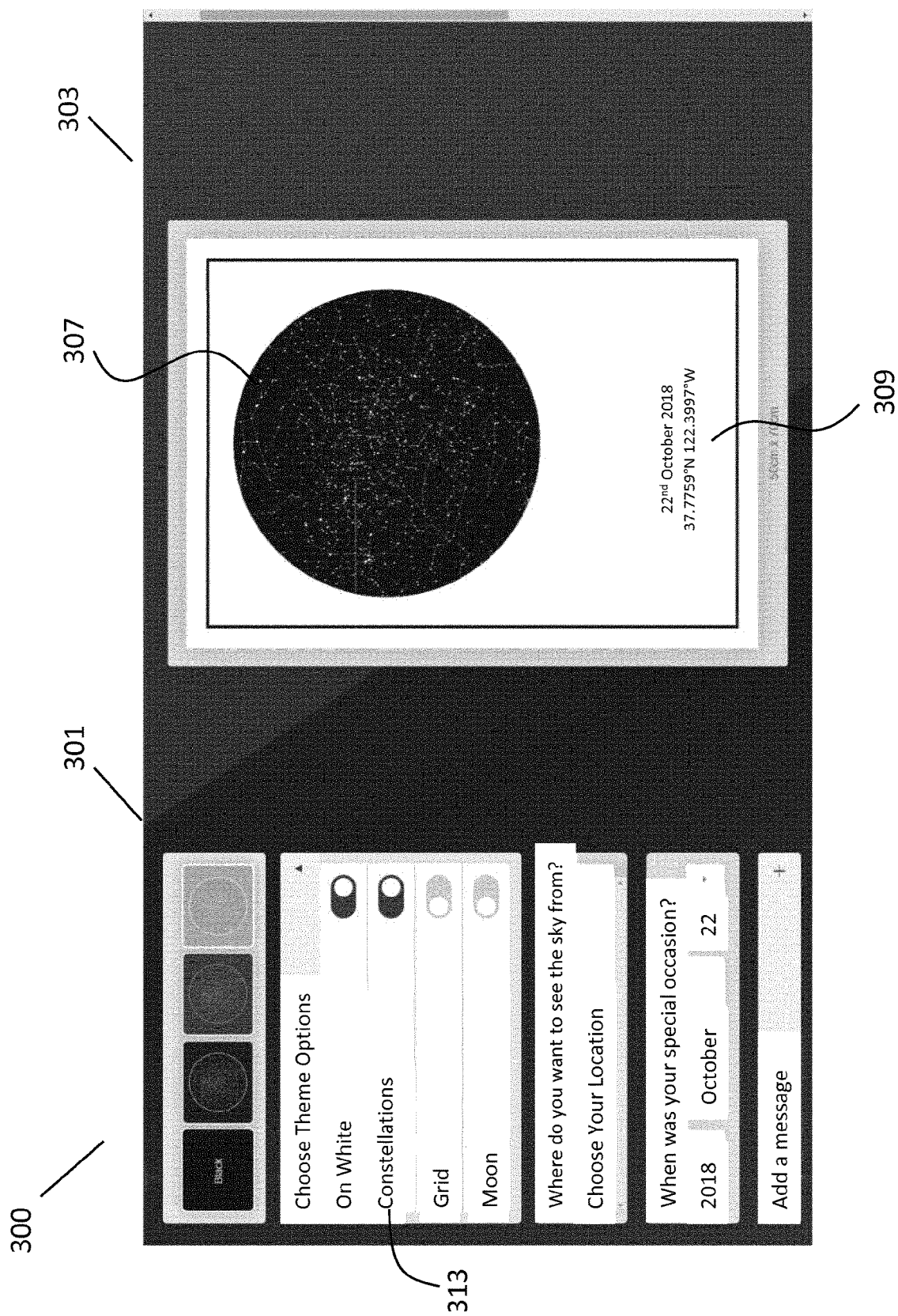
Figure 6:
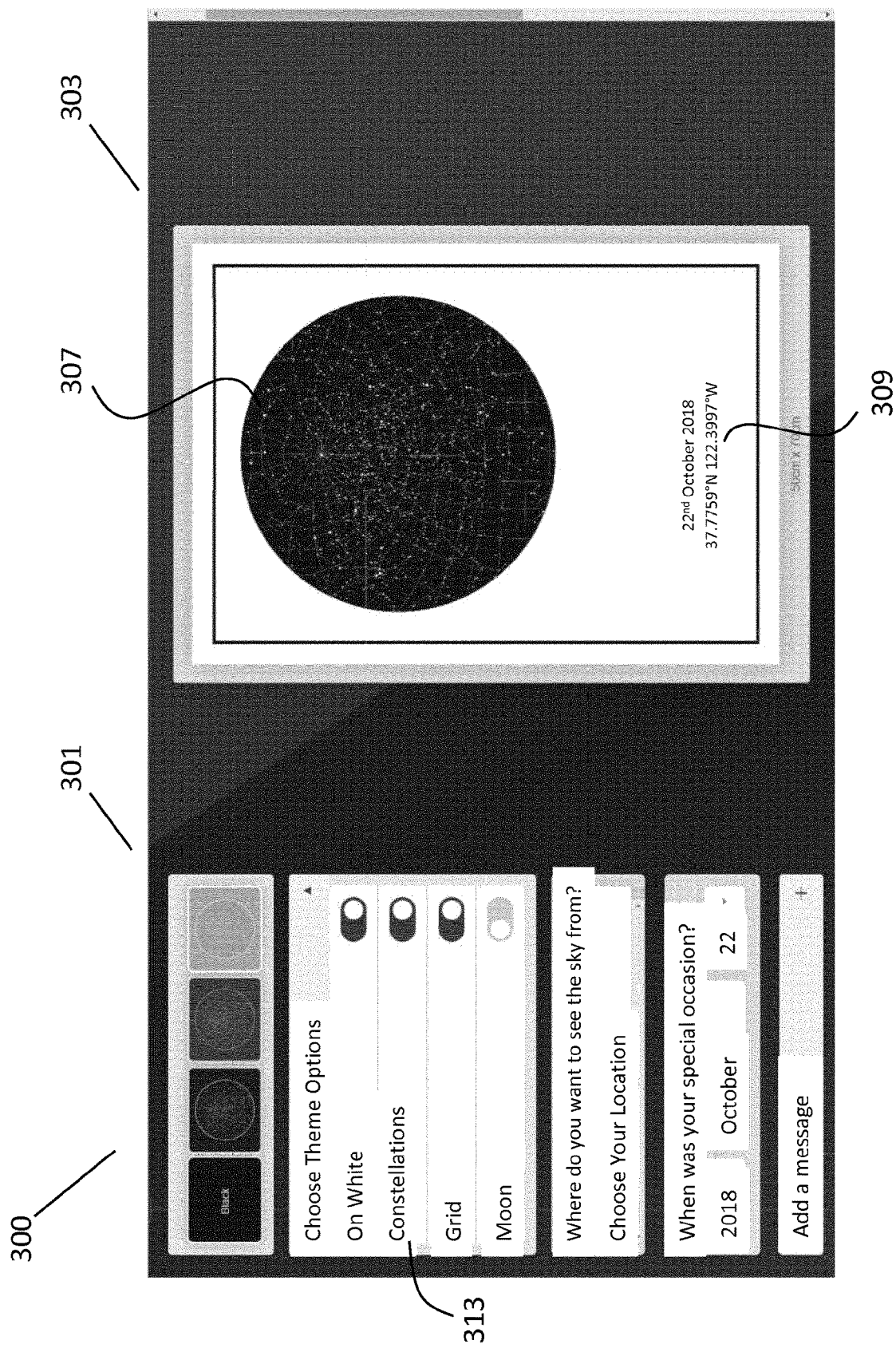
Figure 7:
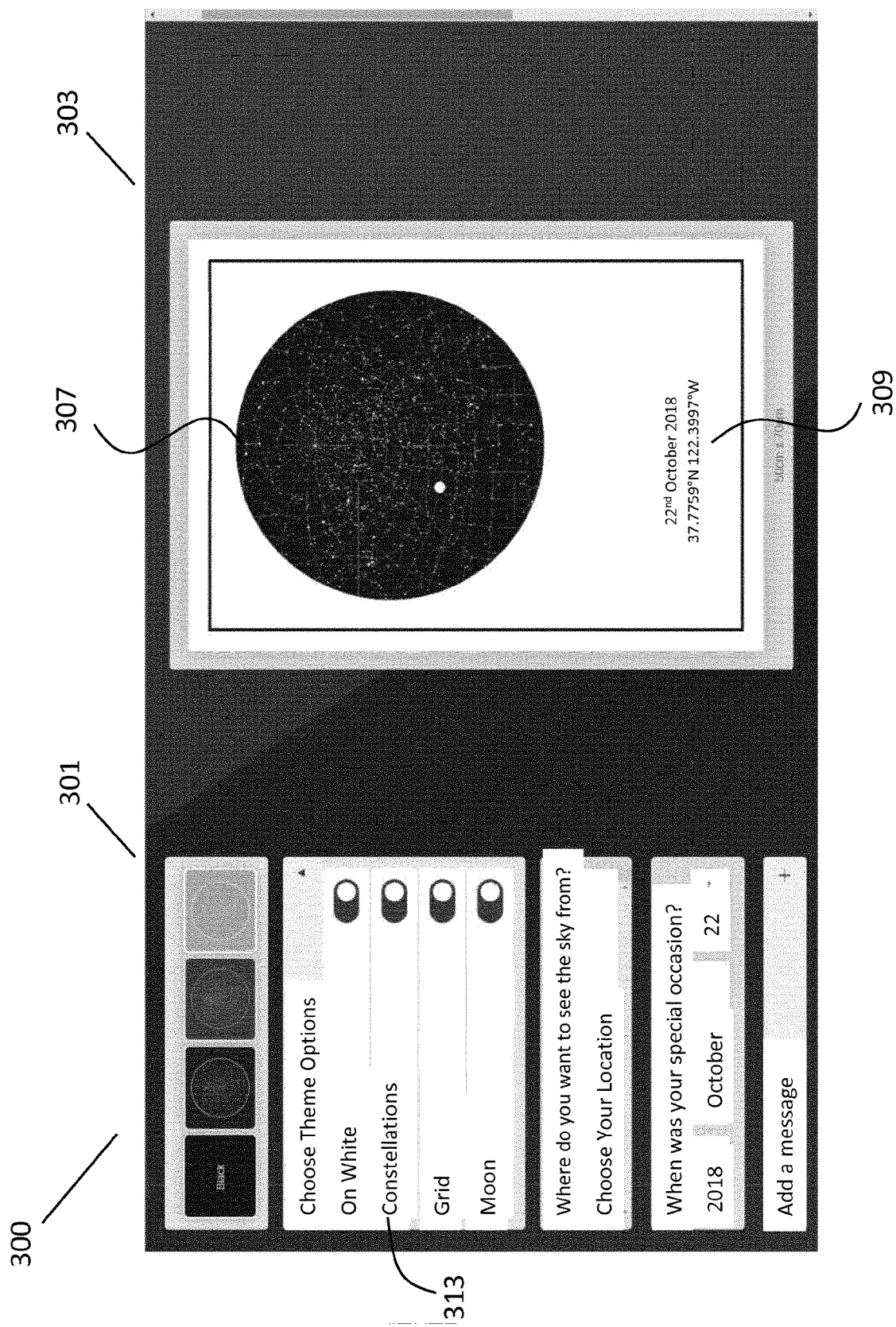

Referring specifically to FIGS. 4 to 7 inclusive, there are shown representations of the article of manufacture when each of the four theme options criteria are toggled on. Referring first of all to FIG. 4, the "on white" theme option criteria has been selected and the colours of the background, border, trim and wording of the article of manufacture are reversed. In other words, previously the background and border were in colour with the trim and the wording in white. When the "on white" theme option is toggled, the background and border are now in white while the trim and wording are in colour. Referring specifically to FIG. 5, the "constellations" theme option criteria has been toggled on and the constellations are illustrated on the celestial map field 307. Referring specifically to FIG. 6, the "grid" theme option criteria has been toggled on and a grid is provided superimposed on top of the celestial map field 307. Referring specifically to FIG. 7, the "moon" theme option criteria has been toggled on and the moon is illustrated on the celestial map field 307.

Figure 8:
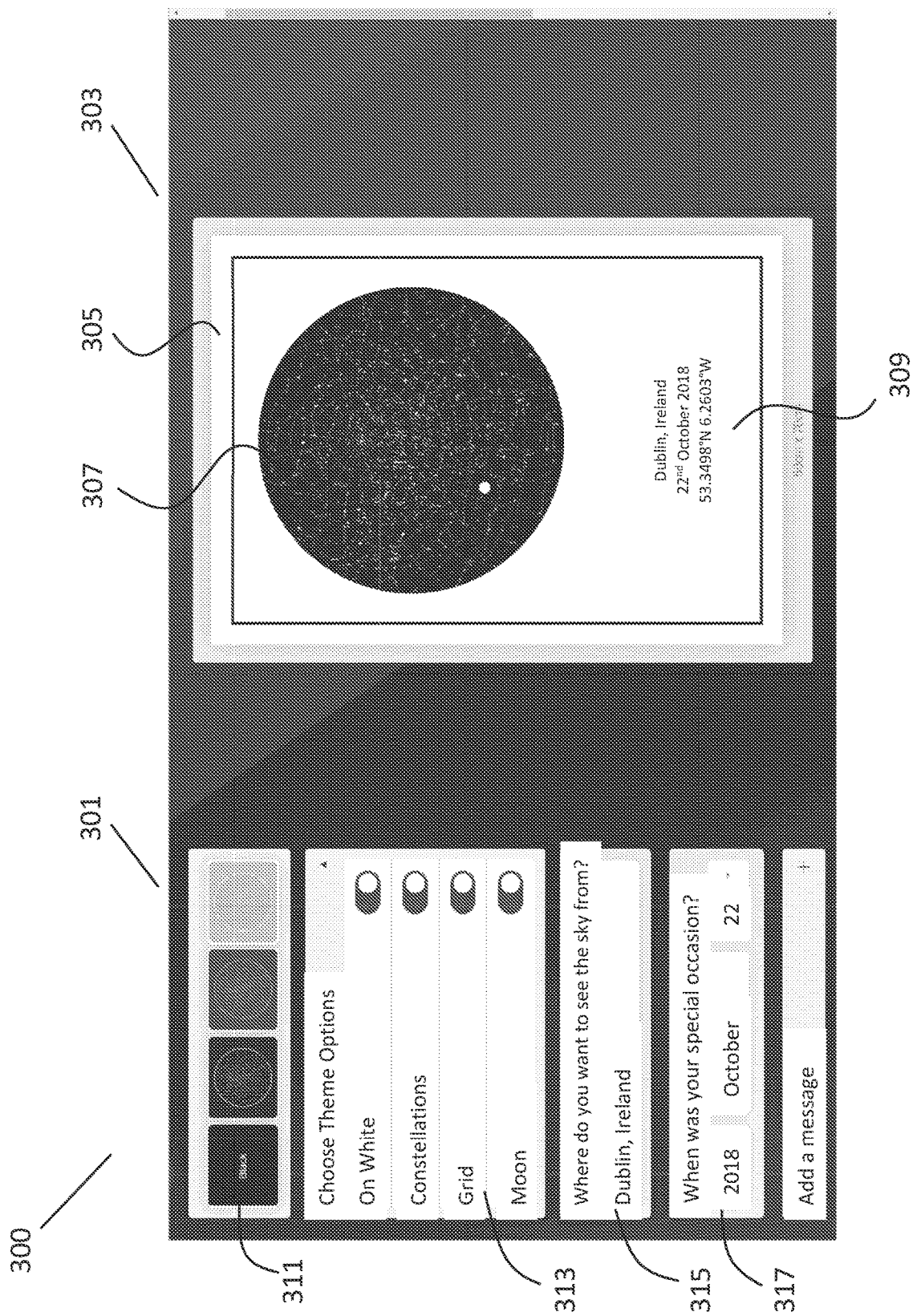

Referring now to FIG. 8, beneath the colour menu field 311 and the "choose theme options" criteria drop down list 313 are the "location" data 315 and "date" data 317 fields. In FIG. 8, the operator has entered "Dublin, Ireland" into the "location" data field 315 and it will be noted that the words "Dublin, Ireland" are now populated into the text field 309 of the template. The relevant date, in this case 22 Oct. 2018 has already been entered into the "date" data field 317 and this is also reflected in the text field 309 on the template.

Figure 9:
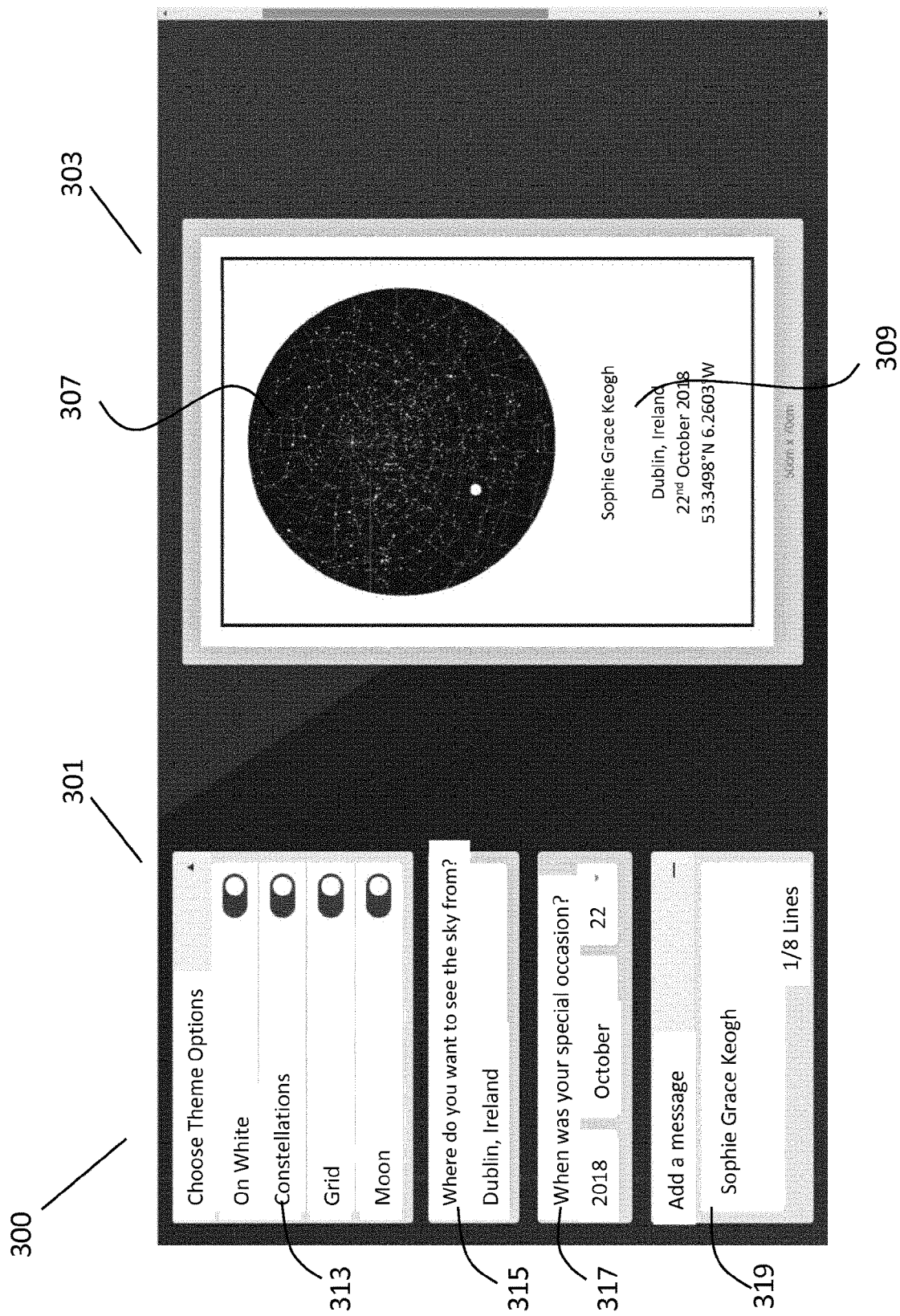

Referring now to FIG. 9, the left-hand side screen component 301 has been scrolled down and the "add a message" field 319 has been expanded. The operator may insert free text into the "add a message" field and in this instance, the words "Sophie Grace Keogh" are inserted into the "add a message" field". It can be seen that the words "Sophie Grace Keogh" thereafter appear in the text field 309 of the template.

Figure 10:
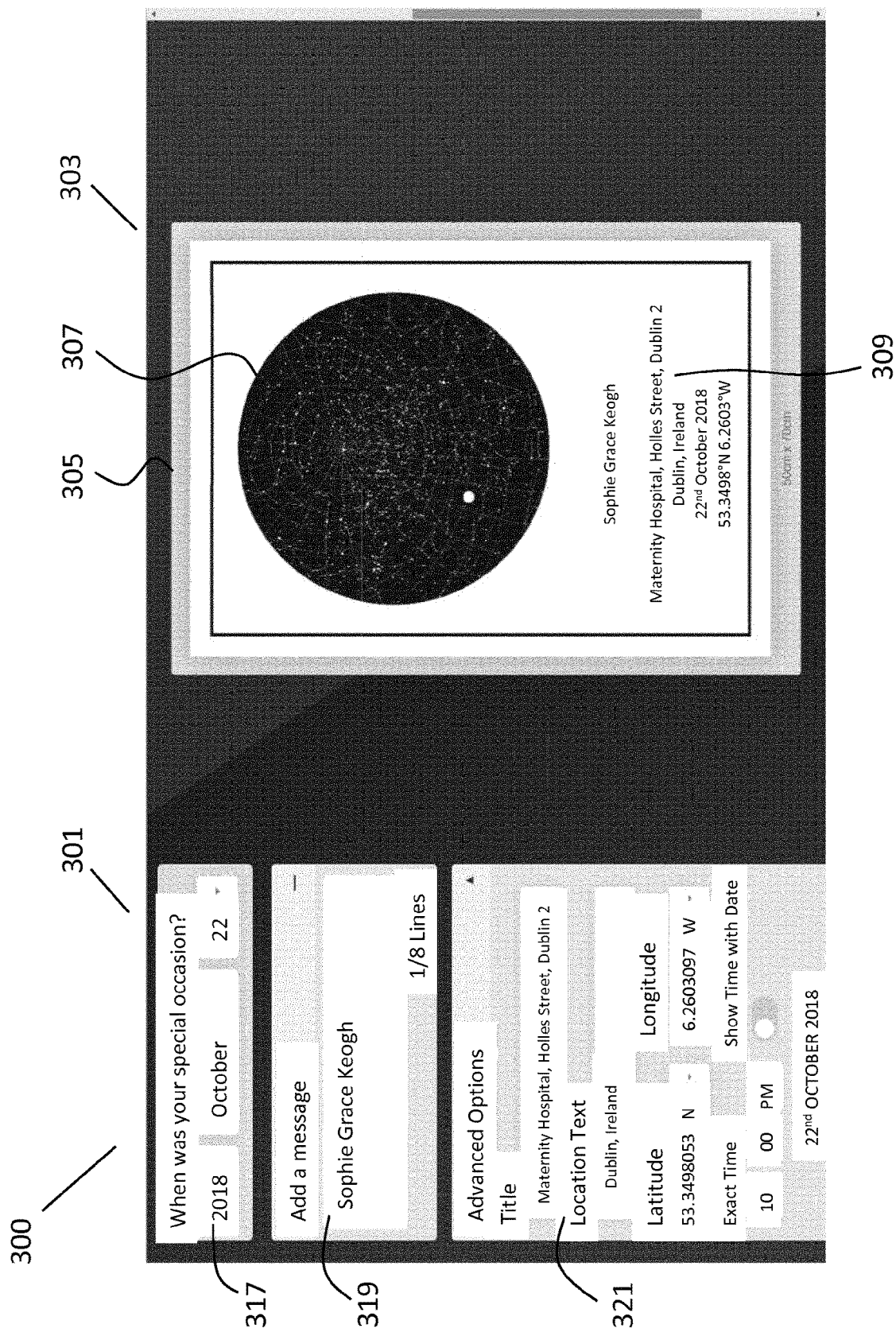
Figure 11:
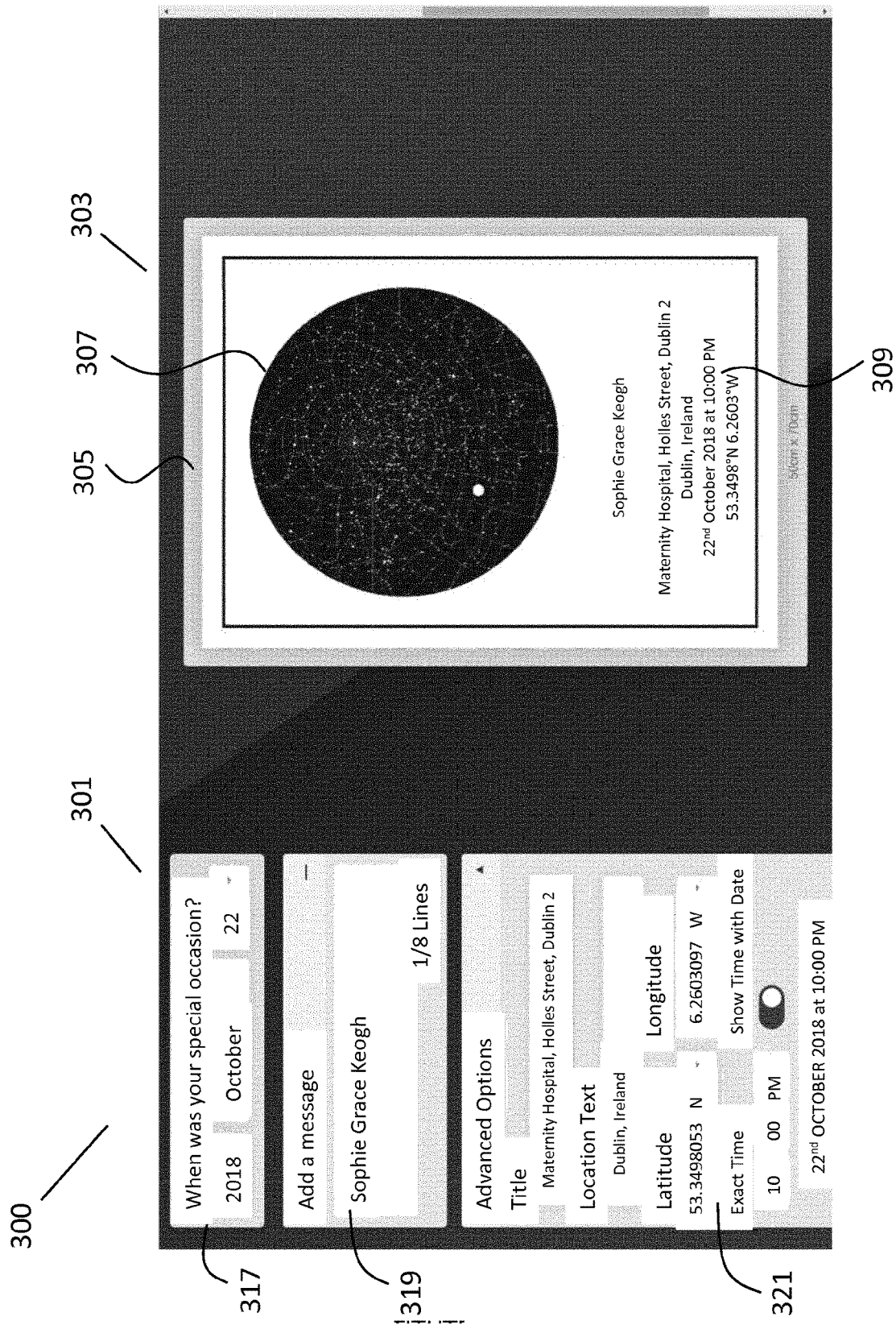
Figure 12:
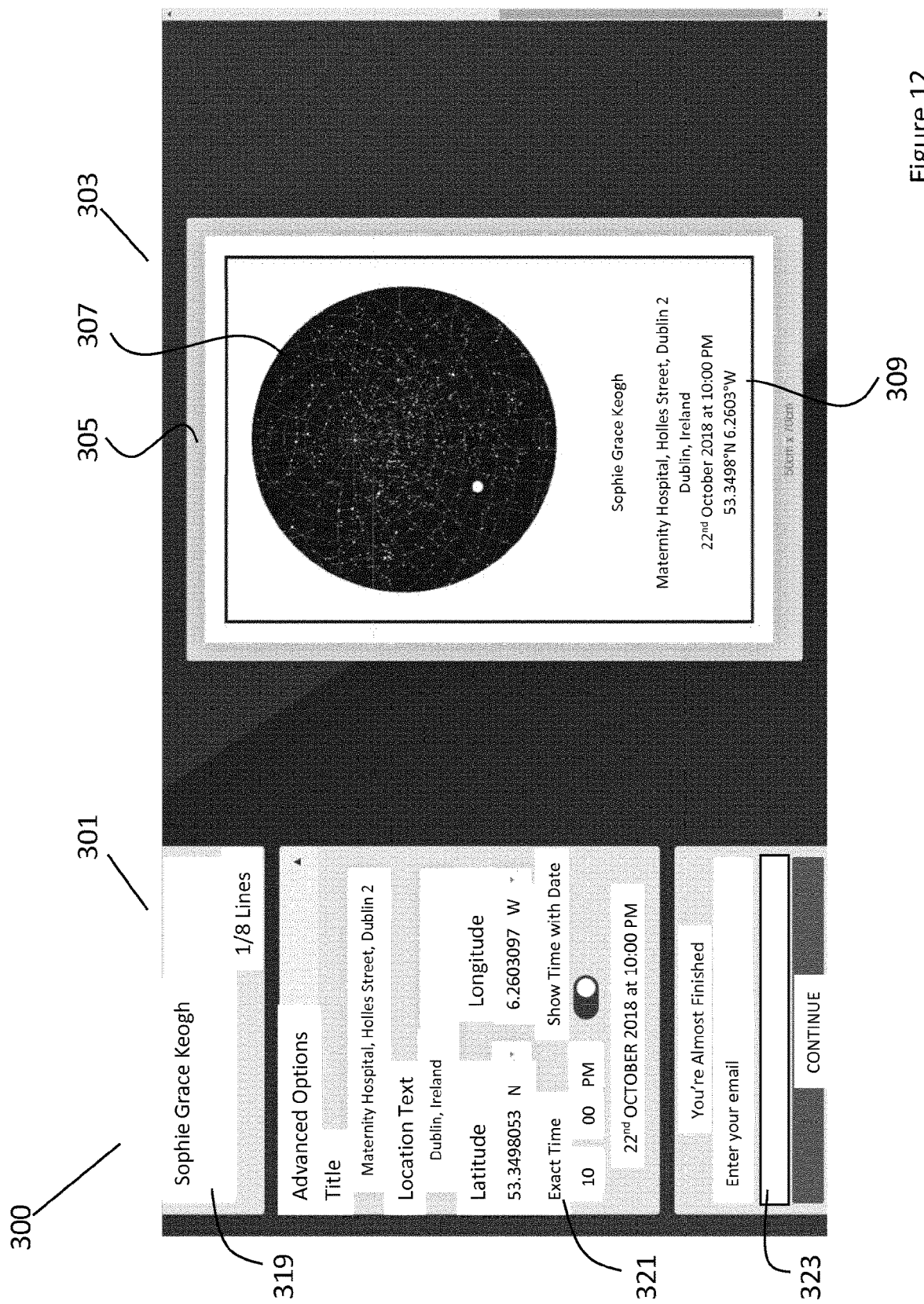

Referring to FIG. 10, the left-hand side screen component 301 has been scrolled down further and an "advanced options" field 321 has been expanded. In this instance, the advanced options include a title field, a location text field, a latitude field, a longitude field, an exact time field and an option to illustrate the exact time with the "show time with date" toggle switch. In FIG. 10, the words "Maternity Hospital, Holles Street, Dublin 2" have been entered into the title field and these are then populated into the text field of the template. The latitude and longitude have been updated automatically to the latitude and longitude of the location and the exact time may be entered. Referring to FIG. 11, the "show time with date" toggle switch has been selected in the known manner and the text field 309 is updated accordingly. Finally, referring to FIG. 12, the left-hand side screen component 301 has been scrolled down further and an email field 323 is shown. The operator may enter their email address in which case a digital copy of their article of manufacture will be sent to them in electronic format so that they can edit or purchase it at a later date.

It will be understood from the preceding example that the article of manufacture could be used to celebrate the birth of a child, a (in this case fictional) "Sophie Grace Keogh" born at 10 pm on 22 Oct. 2018 in the Maternity Hospital, Holles Street, Dublin 2, Ireland. In this way, a highly personalized gift is presented.

Figure 13:
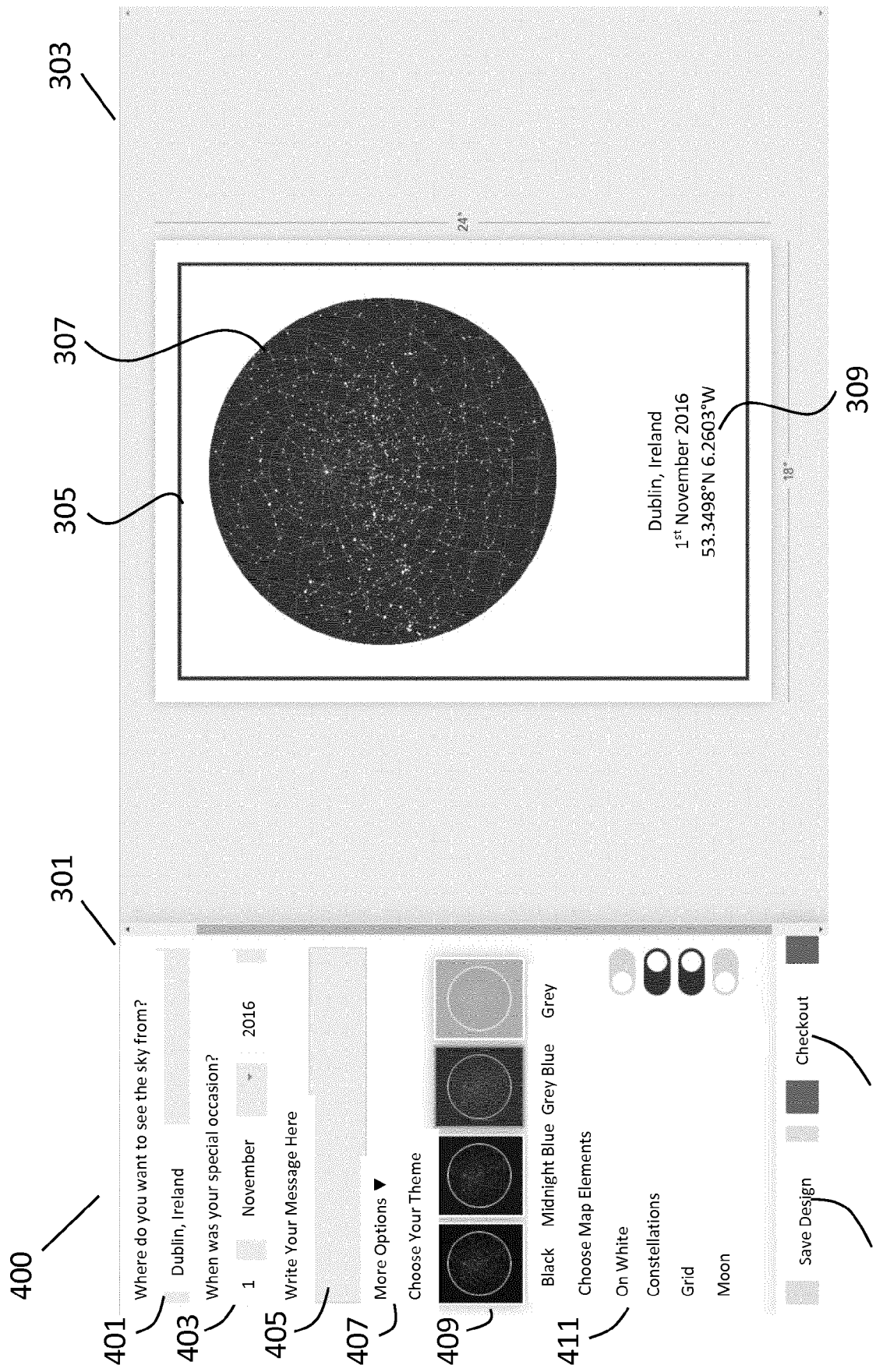
FIGS. 13 and 14 inclusive are screen shots of an alternative user interface operable to implement part of the computer implemented method.
Figure 14:
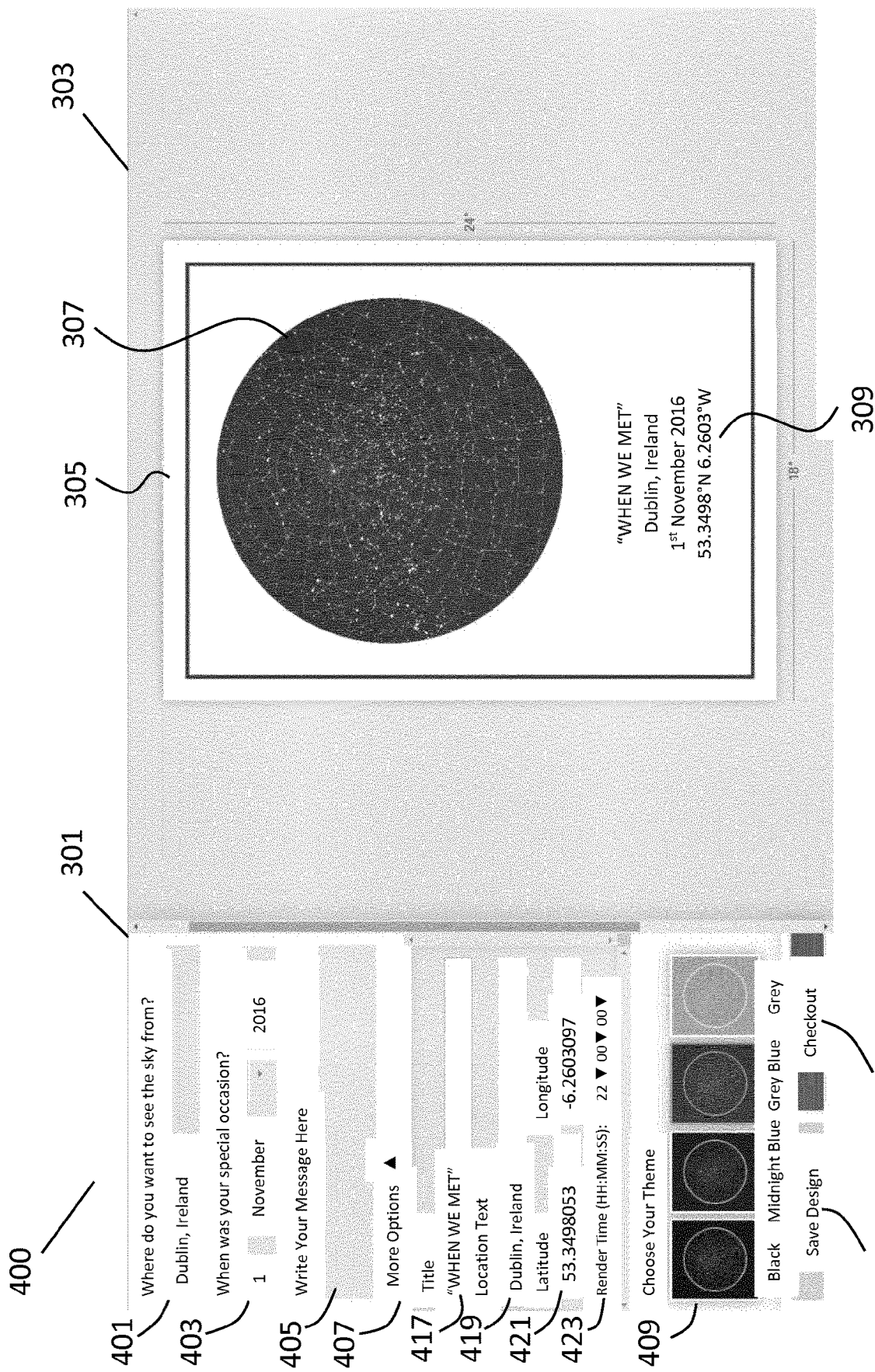

Referring now to FIGS. 13 and 14 inclusive, there is shown a plurality of screen shots of an alternative user interface as may be experienced by a user when operating a browser or a dedicated app on a UCD, where like parts have been given the same reference numerals as before. Referring first of all to FIG. 13, the user interface, indicated generally by the reference numeral 400, is in some respects simpler in appearance and provides a more streamlined experience for the user. As with the embodiment shown in FIGS. 3 to 12, the user interface 400 comprises a split screen format with a left-hand side screen component 301 and a right-hand side screen component 303.

As before, the right-hand side screen component 303 comprises a template 305 with the graphical representation of the rendering of the astronomical catalogue based on the presently selected user data and criteria. The user may scroll down the left-hand side screen component while the right hand-side screen component will remain fixed in position with the full representation of the article of manufacture template on display throughout. The template 305 comprises a pair of distinct fields 307, 309 including the celestial map field 307 and the text field 309 set in a defined location on the template and in a fixed spatial relationship with respect to each other. The celestial map field 307 contains the representation of the night sky and the text field 309 contains at least the date and default latitude and longitude coordinates.

The left-hand side screen component 301 comprises a menu of fields for insertion of user data and criteria that may be selected by the user. In this instance, the menu has been simplified somewhat. At the top of the menu is a location field 401 in which the operator may insert the location that they wish to generate the map view from. Below the location field 401 there is a date field 403 for insertion of the relevant date and there is further provided a message field 405 in which the user may write a message that will be populated into the text field 309 of the template. As before, there is provided a theme component including a colour option buttons 409 and map element options 411 which operate in the manner described with reference to FIGS. 3 to 12 inclusive. There is further provided a save design button 413 and a checkout button 415 that will allow a user to store their progress for future confirmation of order/review and to purchase the gift respectively.

The left-hand side screen component 301 further comprises a "more options" field 407 that, when selected in the known manner, expands the field 407 offering a number of options as illustrated in FIG. 14. The options include a title field 417 in which the user may insert a title, such as "when we met" that will in turn be populated into the text field 309 of the template. The options further include a location text field 419, a latitude and longitude text field 421 in which the user can insert the latitude and longitude coordinates rather than a text address, and a render time field 423 in which the user may specify the time at which the star map is to be rendered on the given date from the given location. If a time is not specified, a default time, for example, 11.59 pm may be used.

In addition to the foregoing, in another embodiment of the invention, there is proposed a method, system and computer program product in which instead of the PCD transmitting the populated article of manufacture template to the UCD for display on the GUI of the UCD to the operator of the UCD, the method, system and computer program product provide for the article of manufacture template being populated locally and rendered on the UCD for review and approval by the operator and separately, on the PCD for printing. in other words, the populated article of manufacture template does not have to be transmitted from the PCD to the UCD.

In order to achieve this, an operator loads a website onto their UCD and they enter one or more of the date, time and location. For the location, the user can insert location coordinates in latitude/longitude format however preferably users can enter an address which is sent, via the PCD, to an API which returns latitude/longitude coordinates, which are then in turn used to populate the template and for the rendering of the celestial map field. One API suitable for this purpose is a Google (Registered Trade Mark,®) Maps API. Thereafter, the location coordinates and the date/time are combined to compute and render a preview of their personalized star map on the UCD (users browser or mobile device). Importantly, the PCD does not have to send the star map preview to the device. Instead, the star catalog and algorithms necessary to render the star map are transmitted in machine-readable, but obfuscated form to the UCD via the website, when the webpage loads. This means that previews can be rendered in real-time on the device. By doing so, the method is more efficient, using the processing power of user devices, rather than often limited bandwidth. In this way, as a user types a message, the text in the rendered preview can be updated in real time rather than having to transmit new images from the server for each character which would require a low latency, high bandwidth network connection.

It will be understood that there is provided a Star Map Rendering module that can render a personalized star map, that when provided accepts location coordinates and datetime. The star map rendering module is loaded via a webpage to the UCD and the customer can generate a personalized star map, or load it on the PCD to service print API requests. When the operator has completed the task of populating the article of manufacture template, the parameters used to customize the article of manufacture template are sent to the server (rather than the image data), the customer checks out/completes the order and the accepted parameters are used to render a print version of the file for the print API.

In addition to the foregoing, it has been described throughout the specification that the PCD, on receipt of the order confirmation, transmits the populated article of manufacture template to the print API. This could be achieved using an upload as an HTTP POST to transfer the print to the API. However, it will be understood that this may be achieved in a number of different ways. For example, instead of sending the entire file to the printer, it is envisaged that a link to file on the server will be sent to the printer and the printer may retrieve the image later. The printer, in processing it's queue of items to print, calls back to the PCD (server) to retrieve the print when it is ready to process the order.

Figure 15:
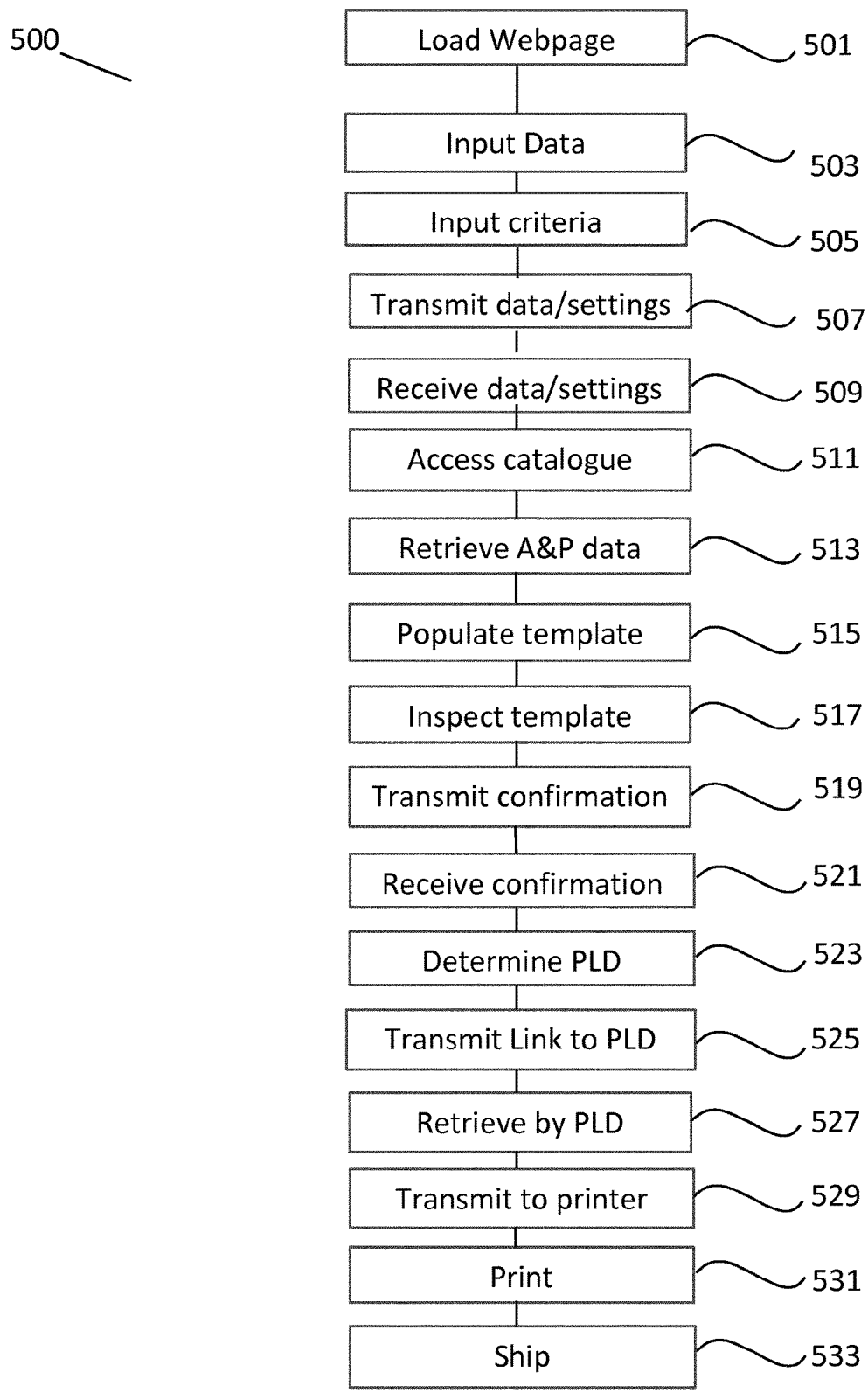
FIG. 15 is a flow diagram of a second embodiment of the computer-implemented method according to the invention.

Referring to FIG. 15, there is shown a flow diagram of an alternative method of implementing the present invention, indicated generally by the reference numeral 500. In step 501, a web page is loaded onto the UCD. This includes the step of loading a star map rendering module including an astronomical catalogue onto the UCD. In step 503, the operator of the UCD inputs data into the GUI of the UCD including one or more of a date, a time and a location. In step 505, the operator inputs into the GUI of the UCD settings for each of the template criteria. In step 507, the UCD transmits the settings for each of the template criterial along with the one or more of the date, the time and the location to the PCD 103 for subsequent rendering by the PCD.

In step 509, the PCD receives the settings and the data including one or more of the date, the time and the location from the UCD. In step 511, the PCD and the UCD both access the astronomical catalogue 105 and input the one or more of the date, the time and the location into the astronomical catalogue and in step 513, the UCD and the PCD both separately retrieve from the astronomical catalogue astrometric and photometric (A&P) data of the plurality of celestial bodies for the one or more of the date, the time and the location. In step 515, the UCD and the PCD populate their local iteration of the article of manufacture template with a rendering of the astrometric and photometric data of the plurality of celestial bodies for the date, the time and the location along with one or more of the date, the time and the location. This includes the UCD and the PCD both populating the local iteration of the article of manufacture template celestial map field with the rendering of the astrometric and photometric data of the plurality of celestial bodies, populating the text field with the one or more of the date, the time and the location, and populating the article of manufacture template in accordance with the settings of the template criteria.

In step 517, the operator of the UCD inspects the template and if satisfied with the result, the operator of the UCD transmits an order confirmation to the PCD in step 519. If the operator is not satisfied, they can terminate the order or they can modify the data and or the criteria to obtain alternative renders until they are happy with the rendered result. Once satisfied, they can then send the order confirmation to the PCD in step 519.

In step 521, the PCD receives the order confirmation and in step 523, the PCD 103 determines the shipping address for the populated article of manufacture template and the PCD selects one of a plurality of geographically spread PLDs 107 based on the proximity of the PLD 107 to the shipping address. In step 525, the PCD transmits a link to file on the PCD containing the populated article of manufacture template to the print API of the PLD. In step 527, the PLD retrieves the populated article of manufacture template and in step 529, the PLD sends the populated article of manufacture template to the accessible printer peripheral device 109 and the accessible printer peripheral device 109 thereafter prints the populated article of manufacture template in step 531 prior to shipping the article in step 533.

In the embodiments shown, the UCD, PCD and the PLD are represented by desktop computers however it will be understood that this is for illustrative purposes only and is not intended to be limiting. For example, the UCD may be a desktop computer such as a personal computer (PC) but may also be a laptop, a tablet, a phablet, a mobile telephone such as a so-called smart phone, a personal digital assistant, or other hand-held computing device. Indeed, the UCD could be a dedicated kiosk in a shopping mall or the like. The PCD may be a desktop computer but is more likely a server or other computing device. Similarly, the PLD may comprise a desktop computer, server or other computing device. Although shown remotely, two or more of the components (the UCD, the PCD and the PLD) could be provided in the same device. For example, it is envisaged that the PCD and the PLD may be co-located and if so, the communication network connecting these components may comprise a wired or wireless local area network or direct cabled connection. All three components could be co-located together in the one apparatus in the instance of a kiosk embodiment.

In the embodiments described, reference is made to accessing an astronomical catalogue containing astrometric and photometric data of a plurality of celestial bodies. One such catalogue that is particularly suitable for use in the implementation of the present invention is the Hipparcos catalogue generated from the European Space Agency's Hipparcos mission.

In order to implement the method using the astronomical catalogue from the Hipparcos mission, the binary catalog was downloaded and the data was parsed, the brightest (>=magnitude 6) star locations and magnitudes were extracted into a web-server friendly format (in this case, a large JSON array). The star data is thereafter compacted and included as a catalog file in a star rendering module/software component for transmission to the UCD as part of a webpage rendered on the UCD. With the star catalog data and for a given time and location, the software component can: (i) calculate the position of stars and the moon position, phase and moon tilt angle as they were or will be seen in the night sky; (ii) compute the stereographic projection of the celestial coordinates onto a spherical plane (draw the globe of stars as a circular map for image rendering); (iii) render equatorial grid and constellation lines on the stereographic projection; and (iv) render the data onto an HTML canvas, which can be rendered on the UCD or transformed into a number of common image formats (e.g. PNG, PDF, JPG).

It will be understood that various parts of the present invention are performed in hardware and other parts of the invention may be performed either in hardware and/or software. It will be understood that the method steps and various components of the present invention will be performed largely in software and therefore the present invention extends also to computer programs, on or in a carrier, comprising program instructions for causing a computer or a processor to carry out steps of the method or provide functional components for carrying out those steps. The computer program may be in source code format, object code format or a format intermediate source code and object code. The computer program may be stored on or in a carrier, in other words a computer program product, including any computer readable medium, including but not limited to a floppy disc, a CD, a DVD, a memory stick, a tape, a RAM, a ROM, a PROM, an EPROM or a hardware circuit. In certain circumstances, a transmissible carrier such as a carrier signal when transmitted either wirelessly and/or through wire and/or cable could carry the computer program in which cases the wire and/or cable constitute the carrier.

It will be further understood that the present invention may be performed on two, three or more devices with certain parts of the invention being performed by one device and other parts of the invention being performed by another device. The devices may be connected together over a communications network. The present invention and claims are intended to also cover those instances where the system is operated across two or more devices or pieces of apparatus located in one or more locations.

In this specification the terms "comprise, comprises, comprised and comprising" and the terms "include, includes, included and including" are all deemed totally interchangeable and should be afforded the widest possible interpretation.

The invention is not limited to the embodiments hereinbefore described but may be varied in both construction and detail within the scope of the appended claims.

The invention claimed is:

1. A computer-implemented method for generating an article of manufacture in a system comprising:
    a user computing device (UCD) having a processor, a memory, a graphical user interface (GUI) and a communications module for communications with a remote device;
    a provider computing device (PCD) having a processor, a memory having an article of manufacture template thereon, and a communications module for communications with remote devices;
    an astronomical catalogue accessible to the PCD, the astronomical catalogue containing astrometric and photometric data of a plurality of celestial bodies; and
    a print lab device (PLD) having a processor, a memory, a print application programming interface (API) and an accessible printer peripheral device;
    the method comprising the steps of:
    an operator of the UCD inputting into the GUI of the UCD one or more of a date, a time and a location and transmitting the one or more of the date, the time and the location to the PCD;
    the PCD receiving the one or more of the date, the time and the location from the UCD;
    the PCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;
    the PCD populating the article of manufacture template with a rendering of the astrometric and photometric data of the plurality of celestial bodies for the one or more of the date, the time and the location along with one or more of the date, the time and the location;
    the PCD transmitting the populated article of manufacture template to the UCD for display on the GUI of the UCD to the operator of the UCD;
    the operator of the UCD transmitting an order confirmation to the PCD;
    the PCD, on receipt of the order confirmation, transmitting the populated article of manufacture template to the print API of the PLD;
    the PLD sending the populated article of manufacture template to the accessible printer peripheral device and the accessible printer peripheral device thereafter printing the populated article of manufacture template for shipping.

2. The computer-implemented method as claimed in claim 1 in which the article of manufacture template comprises a pair of distinct fields including a celestial map field and a text field set in a defined location on the template and in a fixed spatial relationship with respect to each other, and in which the step of the PCD populating the article of manufacture template comprises populating the celestial map field with the rendering of the astrometric and photometric data of the plurality of celestial bodies and populating the text field with the one or more of the date, the time and the location.

3. The computer-implemented method as claimed in claim 1 in which the method comprises the additional intermediate steps of:
    displaying one or more template criteria to the operator of the UCD on the GUI;
    the operator inputting into the GUI of the UCD settings for each of the template criteria and transmitting the settings for each of the template criteria along with the one or more of the date, the time and the location to the PCD; and
    the PCD further populating the article of manufacture template in accordance with the settings of the template criteria.

4. The computer-implemented method as claimed in claim 1 in which the method comprises the steps of:
    determining the shipping address for the populated article of manufacture template; and
    the PCD, on receipt of the order confirmation, selecting one of a plurality of geographically spread PLDs based on the proximity of the PLD to the shipping address prior to transmitting the populated article of manufacture template to the print API of the selected PLD.

5. The computer-implemented method as claimed in claim 1 inclusive in which instead of the step of the PCD transmitting the populated article of manufacture template to the UCD for display on the GUI of the UCD to the operator of the UCD, the method comprises the initial step of:
    loading a star map rendering module including an astronomical catalogue and an article of manufacture template onto the UCD; and thereafter the subsequent intermediate steps of:
    the UCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the UCD populating the article of manufacture template with a rendering of the astrometric and photometric data of the plurality of celestial bodies for the one or more of the date, the time and the location along with one or more of the date, the time and the location; and the UCD displaying the thus-populated article of manufacture template on the GUI of the UCD to the operator of the UCD.

6. A computer program product residing on a non-transitory computer readable medium having a plurality of instructions stored thereon which, when executed by a processor, cause the processor to perform operations comprising:

receiving one or more of a date, a time and a location from a remote user computing device (UCD), having a processor, a memory, a graphical user interface and a communications module for communications with a remote device;

accessing an astronomical catalogue, accessible to a provider computing device (PCD) having a processor, a memory having an article of manufacture template thereon, and a communications module for communications with remote devices, and inputting the one or more of the date, the time and the location into the astronomical catalogue and retrieving from the astronomical catalogue astrometric and photometric data of a plurality of celestial bodies for the one or more of the date, the time and the location;

populating an article of manufacture template with a rendering of the astrometric and photometric data of the plurality of celestial bodies for the one or more of the date, the time and the location along with one or more of the date, the time and the location;

receiving an order confirmation from the remote UCD, and, on receipt of the order confirmation, transmitting the populated article of manufacture template to the print application programming interface (API) of a print lab device (PLD) having a processor, a memory, and an accessible printer peripheral device, the PLD sending the populated article of manufacture template to the accessible printer peripheral device and the accessible printer peripheral device thereafter printing the populated article of manufacture template for shipping.

7. The computer program product as claimed in claim 6 in which the article of manufacture template comprises a pair of distinct fields including a celestial map field and a text field set in a defined location on the template and in a fixed spatial relationship with respect to each other, and in which the step of populating the article of manufacture template comprises populating the celestial map field with the rendering of the astrometric and photometric data of the plurality of celestial bodies and populating the text field with the one or more of the date, the time and the location.

8. The computer program product as claimed in claim 6 comprising the additional intermediate steps of:

receiving settings for a plurality of template criteria along with the one or more of the date, the time and the location; and further populating the article of manufacture template in accordance with the settings of the template criteria.

9. The computer program product as claimed in claim 6 comprising the steps of:

determining the shipping address for the populated article of manufacture template; and selecting one of a plurality of geographically spread PLDs based on the proximity of the PLD to the shipping address prior to transmitting the populated article of manufacture template to the print API of the selected PLD.

10. The computer program product as claimed in claim 6 comprising the step of:

transmitting the populated article of manufacture template to a remote UCD for display on a graphical user interface (GUI) of the UCD.

11. A computing system for generating an article of manufacture comprising:

a remote user computing device (UCD) having a processor, a memory, a graphical user interface (GUI) and a communications module for communications with a remote device;

a provider computing device (PCD) having a processor, a memory having an article of manufacture template thereon, and a communications module for communications with remote devices;

an astronomical catalogue accessible to the PCD, the astronomical catalogue containing astrometric and photometric data of a plurality of celestial bodies; and a print lab device (PLD) having a processor, a memory, a print application programming interface (API) and an accessible printer peripheral device;

the system being configured to perform the operations of:

receiving from an operator of the UCD input into the GUI of the UCD comprising one or more of a date, a time and a location and transmitting the one or more of the date, the time and the location to the PCD;

the PCD receiving the one or more of the date, the time and the location from the UCD;

the PCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the PCD populating the article of manufacture template with a rendering of the astrometric and photometric data of the plurality of celestial bodies for the one or more of the date, the time and the location along with one or more of the date, the time and the location;

the PCD transmitting the populated article of manufacture template to the UCD for display on the GUI of the UCD to the operator of the UCD;

the UCD transmitting an order confirmation to the PCD;

the PCD, on receipt of the order confirmation, transmitting the populated article of manufacture template to the print API of the PLD;

the PLD sending the populated article of manufacture template to the accessible printer peripheral device and the accessible printer peripheral device (109) thereafter printing the populated article of manufacture template for shipping.

12. The computing system for generating an article of manufacture as claimed in claim 11 in which the article of manufacture template comprises a pair of distinct fields including a celestial map field and a text field set in a defined location on the template and in a fixed spatial relationship with respect to each other, and in which the system is configured to populate the celestial map field with the rendering of the astrometric and photometric data of the plurality of celestial bodies and populate the text field with the one or more of the date, the time and the location.

13. The computing system for generating an article of manufacture as claimed in claim 11 in which the system is configured to:

receive settings for a plurality of template criteria along with the one or more of the date, the time and the location; and further populate the article of manufacture template in accordance with the settings of the template criteria.

14. The computing system for generating an article of manufacture as claimed in claim 11 in which the system is configured to:

determine the shipping address for the populated article of manufacture template; and select one of a plurality of geographically spread PLDs based on the proximity of the PLD to the shipping address prior to transmitting the populated article of manufacture template to the print API of the selected PLD.

15. The computing system for generating an article of manufacture as claimed in claim 11 inclusive in which instead of the system being configured to perform the step of the PCD transmitting the populated article of manufacture template to the UCD for display on the GUI of the UCD to the operator of the UCD, the system is configured to perform the initial step of:

loading a star map rendering module including an astronomical catalogue and an article of manufacture template onto the UCD; and the system is configured to thereafter perform the subsequent intermediate steps of:

the UCD accessing the astronomical catalogue and inputting the one or more of the date, the time and the location into the astronomical catalogue and retrieving from the astronomical catalogue astrometric and photometric data of the plurality of celestial bodies for the one or more of the date, the time and the location;

the UCD populating the article of manufacture template with a rendering of the astrometric and photometric data of the plurality of celestial bodies for the one or more of the date, the time and the location along with one or more of the date, the time and the location; and the UCD displaying the thus-populated article of manufacture template on the GUI of the UCD to the operator of the UCD.

16. The computing system for generating an article of manufacture as claimed in claim 12 in which the system is configured to:

receive settings for a plurality of template criteria along with the one or more of the date, the time and the location; and further populate the article of manufacture template in accordance with the settings of the template criteria.

17. The computer-implemented method as claimed in claim 2 in which the method comprises the additional intermediate steps of:

displaying one or more template criteria to the operator of the UCD on the GUI;

the operator inputting into the GUI of the UCD settings for each of the template criteria and transmitting the settings for each of the template criteria along with the one or more of the date, the time and the location to the PCD; and the PCD further populating the article of manufacture template in accordance with the settings of the template criteria.

18. The computer program product as claimed in claim 7 comprising the additional intermediate steps of:

receiving settings for a plurality of template criteria along with the one or more of the date, the time and the location; and further populating the article of manufacture template in accordance with the settings of the template criteria.

\* \* \* \* \*